Patented Nov. 27, 1951

2,576,845

UNITED STATES PATENT OFFICE 2,576,845

METHOD OF PROTECTIVELY COATING METAL AND THE RESULTING COATED PRODUCT

Alexander McDonald, Gordon, near Sydney, New South Wales, Australia, assignor to Industrial Metal Protectives, Inc., Wilmington, Del., a corporation of Delaware No Drawing. Original application November 14, 1946, Serial No. 709,770. Divided and this application October 24, 1949, Serial No. 127,985. In Australia January 17, 1946

7 Claims. (Cl. 117—71)

This invention relates to coating of metal or other surfaces, and more particularly is directed to coating of metal or other surfaces with compositions employing sodium silicate and finely divided metals such as zinc, lead, aluminum, magnesium, cadmium or alloys thereof.

This application is a divisional application of my co-pending application, Serial No. 709,770, filed November 14, 1946, now Patent No. 2,509,875, issued May 30, 1950.

It is known to prepare coating compositions from commercial grades of sodium silicate and metal dust, more particularly zinc dust. The proportion of sodium oxide ($Na_2O$) to silica ($SiO_2$) in one grade which has been practically used being one mole of sodium oxide to two moles of silica. It is also known to render these coatings insoluble by applying heat thereto.

The grade of sodium silicate referred to above is very alkaline and, when used as a vehicle for zinc dust, quickly attacks the zinc after being mixed, evolving hydrogen, the time of commencement of attack varying considerably with temperature, and further, requires a high temperature to render it insoluble. It is noticeable that when applied to plates of thick section it is more easily affected by moisture condensed from furnace gases (used in heating the surface to produce substantial insolubility) than is the case when a sodium silicate containing a greater proportion of $SiO_2$ is employed. It also gives a considerable efflorescence of sodium carbonate when exposed to the air. This efflorescence probably also contains basic zinc carbonate. Sodium silicate of higher $SiO_2$ content than 1:2 when used as a vehicle gives a much harder coat at a lower baking temperature but tends to crack where applied thickly.

It is an object of the present invention to provide a method of coating metal and other surfaces with a protective coating which will cause the coating firmly to adhere to the surfaces to be protected against corrosion.

It is another object of the invention to provide metal and other surfaces with a corrosion resistant coating consisting of metal dust and an alkali metal silicate.

These and other objects and advantages of the invention will appear more clearly from the following description setting forth the invention in detail.

According to the present invention there is applied to the surfaces to be coated first a composition comprising finely divided metal and sodium silicate in which the ratio of the alkali metal oxide to silicate is within the range of from 1:2.3 to 1:3.0, and thereafter is super-imposed on the first coating a composition of alkali metal silicate and finely divided lead.

In practice the two commercial grades of sodium silicate, in which the ratio of sodium oxide to silica is 1:2 in the one case and 1:3.3 in the other, are preferably both separately made up to a specific gravity of 1.3. However, if desired, the silicate having the desired ratio of $Na_2O$ to $SiO_2$ may be prepared in any other convenient way. These two liquids are then mixed in equal proportions to give the desired sodium silicate solution. The pH value of this liquid is approximately 11.0 but liquids have been used having a pH value of 11.3 to 10.8, which corresponds to a ratio of $Na_2O$ to $SiO_2$ of 1:2.3 to 1:3.0. The higher the ratio, the greater the tendency to crack with thick coats, while the lower the ratio the greater is the initial water solubility and higher baking temperature required.

The silicate solution may be diluted to a specific gravity of 1.26 to give a vehicle for a slower drying coat for field work in hot dry winds. A coating composition made from a silicate solution so diluted is also advantageous for spraying purposes. When a silicate solution is used which has a specific gravity lower than 1.26, a much thinner coat results.

A satisfactory mix is obtained by employing 30 ml. of sodium silicate of the above described composition with 100 grammes of very fine zinc dust. This mix requires baking to 250° F. to attain insolubility. Ammonia or a fatty acid may be added to facilitate spreading and adhesion.

It has been found that the addition of certain lead compounds, notably red lead, delays the attack by the alkali on the zinc. This attack results in the formation of sodium zincate, a compound which causes gelation of the silica and consequent cracking of the film. The addition of small amounts of red lead thus enables mixes to be kept for longer periods under adverse conditions. Such coatings have given good performance in sea water.

I have also found that certain lead compounds, notably lead chromate, will render the coating insoluble without application of any appreciable degree of heat. The lead chromate may be used as a dry powder or as a paste containing 50% by weight of water. All proportions of lead chromate stated hereafter are on the wet basis. Litharge and white lead have also been used for this purpose but are not as satisfactory as lead chromate. Under normal conditions the setting takes place in 3 to 6 days, but in cold damp weather may take from 2 to 3 weeks, while in direct sunlight it may take less than 48 hours. The percentage of lead chromate used ranges from 1 to 10%. If more than 10% of lead chromate is used, the mix thickens rapidly and, when applied, tends to crack. A mixture which has proven to be particularly advantageous is 5% lead chromate and 5% red lead, the red lead giving added salt water resistance and increasing the antifouling properties of the coat without the adverse effects of thickening and cracking noticed when 10% of the chromate alone is used.

While reference has been made to the incorporation of lead compounds for improving the antifouling properties of the coating, the antifouling properties also may be similarly improved by the incorporation of other antifouling agents of which arsenic oxide is an example.

Where the lead compounds are used in the coating compositions, they may be thoroughly mixed with the silicate solution before the addition of the zinc. The zinc dust must then be added to the mixture before the lead compounds cause gelation. It has also been found possible to mix the dry powdered lead compounds with the zinc dust and then to add the silicate solution.

Cement may be mixed with the zinc dust in proportions up to 10% by weight of the mix. This gives a quick setting coat but the mixture does not keep. 5% cement and 5% litharge may be used with advantage.

A further improvement of the new composition set forth above can be obtained by using metal dust, the average particle size of which is not larger than 3 microns.

*Example I*

A simple mix which has proved satisfactory is:

Sodium silicate of ratio $Na_2O:SiO_2$ of
1:2.6 _____ milliliters__ 30
Zinc dust _____ grammes__ 100

*Example II*

Another typical mix used in practice is:

Red lead _____ ozs__ 8
Lead chromate _____ ozs__ 4
Sodium silicate of ratio $Na_2O:SiO_2$ of 1:2.6 pts__ 6

Mix thoroughly and add:

Superfine zinc powder _____ lbs__ 21

This mixture will yield approximately one gallon of the coating composition according to the invention.

The mix is brushed or sprayed onto the surface to be protected, and is allowed to dry for 2 hours. It is then raised, preferably in a substantially moisture-free atmosphere, to a temperature of 200–300° F.

It is important that for thick iron sections the baking operation should take place in a moisture-free atmosphere. In the case of thin iron sections, this condition is not so important, however.

If, in the above mentioned example, zinc dust is used having a particle size larger than 3 microns, say for instance 6 microns, satisfactory results can still be obtained with the ratio of $Na_2O:SiO_2$ of from 1:2.3 to 1:3.0 if the quantity of the zinc dust in the mixture is increased.

In this connection a mixture of the following constitution and in the following proportions may be used:

*Example III*

Red lead _____ grammes__ 7
Lead chromate _____ do_____ 5
Zinc dust _____ do_____ 163
Sodium silicate having the ratio of $Na_2O:SiO_2$ of from 1:2.3 to 1:3.0 milliliters__ 31

A particularly advantageous composition will be obtained when of the metal dust, having an average particle size of not more than 3 microns, at least 90 per cent is capable of passing through a 400 mesh Tyler sieve. A composition made up with such metal dust is distinguished by an especially great adhesion and will allow bending of the coating article to a greater degree than has heretofore been possible without destroying or affecting the coating.

While the compositions have been described above in connection with sodium silicate, it has been found that satisfactory results will also be obtained when replacing some or all of the sodium silicate by potassium silicate.

While in the above mentioned Examples II and III the percentage of lead chromate is given with the understanding that the lead chromate is in the form of dry powder, it is of course understood that, if desired, lead chromate may also be used as a paste containing 50 per cent by weight of water. In this last mentioned instance twice the weight will be required.

A protective coating against sulphuric acid may be provided for steel by first coating the steel with a sodium silicate zinc dust composition according to this invention and subsequently superimposing another coating comprising a composition of sodium silicate and lead dust upon the said first coating.

The present method further includes the following steps (a) applying to the surface to be coated a composition comprising finely divided metal and sodium silicate, the ratio of sodium oxide to silica being within the range of from 1:2.3 to 1:3.0, and (b) superimposing on the first coating a composition of sodium silicate and finely divided lead.

The finely divided metal may be selected from the group of zinc, lead, aluminum, magnesium, cadmium, or alloys thereof. The first coating is baked at a temperature within the range of from 200° F. to 300° F. and for a time sufficient to dehydrate and set the coating on the metal surface.

It is of course understood that the present invention is by no means limited to the specific examples set forth, nor to the specific method described before but also comprises any modifications within the scope of the appended claims.

What I claim is:

1. A method of coating metal comprising the steps of applying to the surface to be coated a composition comprising finely divided metal selected from the group consisting of zinc, aluminum, magnesium, cadmium and alloys thereof, the average particle size of which is 3 microns, at least 90% of which is capable of passing through a 400 mesh Tyler sieve, and an aqueous solution of alkali metal silicate, the ratio of alkali metal oxide to silica defined in moles being between 1:2.3 and 1:3.0, baking the first coating for a time sufficient to dehydrate and set the coating on the surface, and super-imposing on the first coating a composition comprising an aqueous solution of alkali metal silicate and finely divided lead dust.

2. A method of coating metal comprising the steps of applying to the surface to be coated a composition comprising finely divided metal selected from the group consisting of zinc, aluminum, magnesium, cadmium and alloys thereof, the average particle size of which is 3 microns, at least 90% of which is capable of passing through a 400 mesh Tyler sieve, and an aqueous solution of alkali metal silicate, the ratio of alkali metal oxide to silica defined in moles being between 1:2.3 and 1:3.0, baking the first coating at a temperature within the range of from 200° F. to 300° F. and for a time sufficient to dehydrate and set the coating on the surface, and superimposing on the first coating a composition comprising an aqueous solution of alkali metal silicate and finely divided lead dust.

3. A method of coating metal comprising the steps of applying to the surface to be coated a composition comprising finely divided zinc, the average particle size of which is 3 microns, at least 90% of which is capable of passing through a 400 mesh Tyler sieve, and an aqueous solution of alkali metal silicate, the ratio of alkali metal oxide to silica defined in moles being between 1:2.3 and 1:3.0, baking the first coating for a time sufficient to dehydrate and set the coating on the surface, and super-imposing on the first coating a composition comprising an aqueous solution of alkali metal silicate and finely divided lead dust.

4. A method of coating steel comprising the steps of applying to the surface of the steel a composition comprising zinc dust, the average particle size of which is 3 microns, at least 90% of which is capable of passing through a 400 mesh Tyler sieve, and an aqueous solution of sodium silicate, the ratio of sodium oxide to silicate defined in moles being within the range of 1:2.3 to 1:3.0, baking the first coating for a time sufficient to dehydrate and set the coating on the surface, and super-imposing on the first coating a composition comprising an aqueous solution of sodium silicate and lead dust.

5. A metal article having on the surface thereof a hard protective coating resulting from the application thereto and the drying thereon of superimposed layers, the first layer comprising finely divided metal selected from the group consisting of zinc, aluminum, magnesium, cadmium and alloys thereof, the average particle size of which is 3 microns, at least 90% of which is capable of passing through a 400 mesh Tyler sieve, in an aqueous solution of an alkali metal silicate, the ratio of alkali metal oxide to silica defined in moles being between 1:2.3 and 1:3.0, the second layer of which consists of an aqueous solution of alkali metal silicate and finely divided lead dust.

6. A metal article having on the surface thereof a hard protective coating resulting from the application thereto and the drying thereon of superimposed layers, the first layer comprising zinc dust, the average particle size of which is 3 microns, at least 90% of which is capable of passing through a 400 mesh Tyler sieve, in an aqueous solution of an alkali metal silicate, the ratio of alkali metal oxide to silica defined in moles being between 1:2.3 and 1:3.0, the second layer of which consists of an aqueous solution of alkali metal silicate and finely divided lead dust.

7. A metal article having on the surface thereof a hard protective coating resulting from the application thereto and the drying thereon of superimposed layers, the first layer comprising zinc dust, the average particle size of which is 3 microns, at least 90% of which is capable of passing through a 400 mesh Tyler sieve, in an aqueous solution of sodium silicate, the ratio of sodium oxide to silica defined in moles being between 1:2.3 and 1:3.0, the second layer of which consists of an aqueous solution of sodium silicate and finely divided lead dust.

ALEXANDER McDONALD.

REFERENCES CITED

The following references are of record in the file of this patent:

UNITED STATES PATENTS

| Number | Name | Date |
|---|---|---|
| 2,440,969 | Nightingall | May 4, 1948 |

FOREIGN PATENTS

| Number | Country | Date |
|---|---|---|
| 15,131 of 1928 | Australia | 1929 |
| 104,231 | Australia | June 14, 1938 |